H. VON FREMERY.
BALL BEARING FOR THE RUDDER SURFACES OF AIRCRAFT.
APPLICATION FILED JULY 20, 1920.
1,418,993. Patented June 6, 1922.
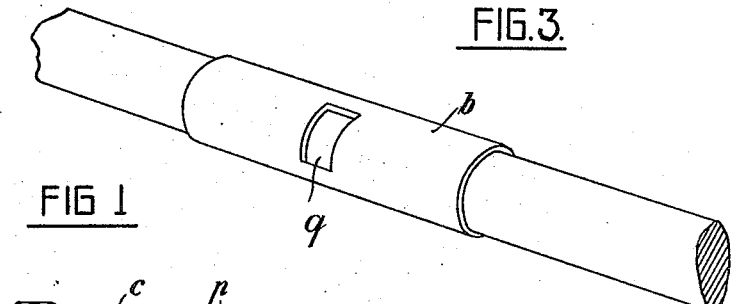
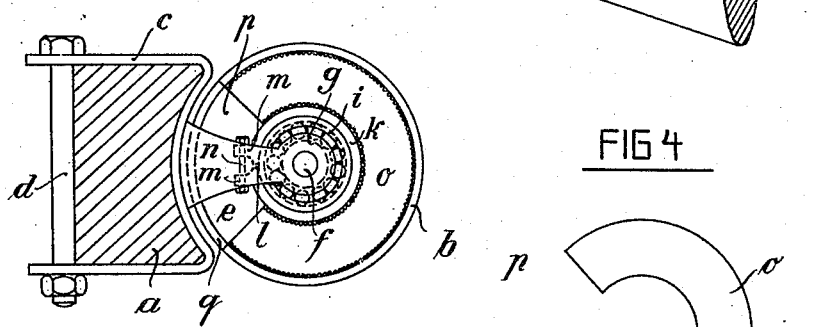
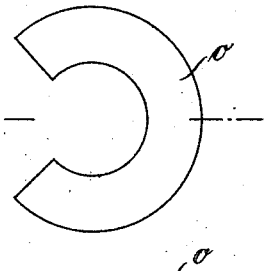
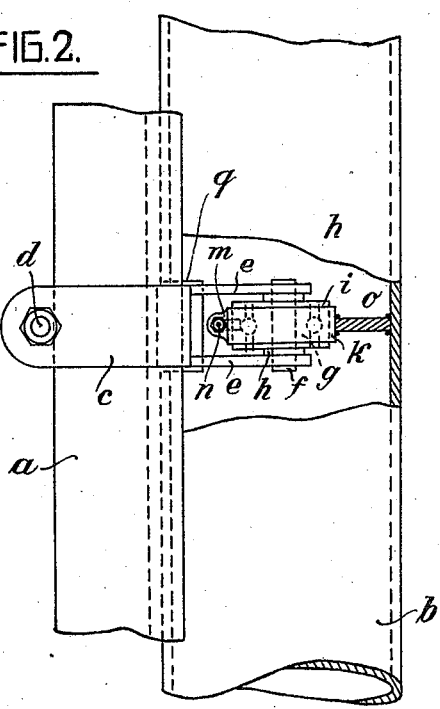
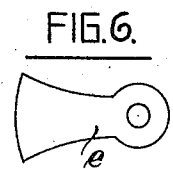
INVENTOR
Hermann von Fremery.
BY Edwin Prd's
ATTORNEYS

UNITED STATES PATENT OFFICE.

HERMANN von FREMERY, OF SCHLOSS SPINDLHOF, NEAR REGENSTAUF, GERMANY.

BALL BEARING FOR THE RUDDER SURFACES OF AIRCRAFT.

1,418,993. Specification of Letters Patent. Patented June 6, 1922.

Application filed July 20, 1920. Serial No. 397,796.

*To all whom it may concern:*

Be it known that I, HERMANN VON FREMERY, a citizen of the Republic Argentina, residing at Schloss Spindlhof, near Regenstauf, Bavaria, Germany, have invented a new and useful Improvement in Ball Bearings for the Rudder Surfaces of Aircraft (for which I have filed applications for patent in Germany, No. 293227, Jan. 8, 1915; Austria, No. 79535, Feb. 18, 1916; and Hungary, Feb. 21, 1916), of which the following is a specification.

My invention relates to a ball bearing arrangement for the rudder surfaces of aircraft. Now it is desirable that these said surfaces shall be always so arranged as to be easily displaceable relatively to the supporting or balancing planes on which they are mounted. This object is attained in accordance with this invention by the interposition of a ball bearing in the link member to be arranged intermediate the two planes or surfaces. The practical realization of this object is, however, in so far rendered difficult, since—firstly, it is desirable that any projection of the bearing structure either upwardly or downwardly beyond the surface of the longitudinal girder be avoided, and secondly, that there be prevented the formation of any considerable distance between the plane and the rudder, and both for the reason of preventing the creation of any additional air resistances to the resistances already produced by the supporting and winding surfaces. The object specified is attained by arranging a slot in the tube surrounding the ball bearing and serving as the main support for the rudder surface.

An embodiment of my invention is shown in the accompanying drawing, in which:

Fig. 1 shows a cross section through a longitudinal girder and the tube with a view of the bearing therein contained.

Fig. 2 is a top view appertaining thereto.

Fig. 3 is a perspective view of the slotted tube.

Figs. 4 and 5 show the cross plate serving to connect the tube with the outer ball race, and Figs. 6 and 7 show respectively a face view and an edge view of the plate serving to connect the inner ball race with the longitudinal girder, and formed to constitute a bearing block.

The longitudinal girder $a$ is chamfered at the side facing the tube $b$ and this in accordance with the curvature thereof, and supports a narrow fitting plate $c$ surrounding the chamfered face and the level upper and underside of the longitudinal girder $a$, said plate being secured in its position by means of a screw $d$ disposed opposite to the chamfered portion. To the strip $c$ there are autogenously welded the two sheet metal brackets $e$, and this in a manner to leave an intermediate space which will be slightly larger than the depth of the ball bearing; if preferred, the said brackets $e$ may be replaced by a forked outrigger. These brackets are adapted to conjointly maintain the ball bearing axis $f$ firmly so as to prevent it from rotating. Intermediate the two brackets $e$ there is rigidly mounted on the said axis $f$ the inner ball race $g$, to either side of which there may be arranged distance blocks or washers $h$. The outer ball race $i$ is enclosed in an annular casing $k$ which may be slotted at $l$ and which is then suitably provided close to the joint $l$ with two ears $m$, $m$ joined by a screw $n$. Autogenously welded on to the ring $i$ is a sheet metal member $o$ having the form of a ring with a sector shaped portion removed, leaving an opening $p$. The said member $o$ is autogenously welded for the extent of its circumference together with the tube $b$. All the welds are indicated in the drawing by thin curved lines.

With the object of providing an ample play, the tube $b$ is provided with a rectangular cut or opening $q$ through which the sheet metal brackets $e$ extend.

I claim:

1. In an air craft, the main support for the rudder surface having a tube provided with a ball bearing and with an opening, supporting means connecting with the ball bearing and extending through said opening, and adapted to be secured to an external support.

2. In an air craft, the main support for the rudder surface having a tubular portion provided with a ball bearing supported therein, and with an opening, and supporting means connecting with the ball bearing and extending through said opening and connecting to an external support.

3. In an air craft, the main support for the rudder surface, having a tubular portion provided with an opening, a ball bearing and means for supporting it in said tubular portion, said bearing having an axle, bracket arms connecting with said axle and extending through said opening, and external means for supporting them.

4. In an air craft, the main support for the rudder surface having a tubular portion, a ball bearing therein, a sector shaped member secured in the tube and to the outer case of the bearing to support the same, said tube having an opening, bracket arms secured to the inner ball race of the bearing and extending out through said opening and adapted to be secured to an external support.

5. A ball bearing arrangement for the rudder surfaces of aircraft, comprising a longitudinal tube of the rudder surface, said tube having a slot or opening, a pair of bracket arms extending through said slot and adapted to support one ball race of a ball bearing, the other ball race being so connected to said tube that the axis of the ball bearing will coincide as accurately as possible with the longitudinal axis of the tube of the rudder surface.

In testimony whereof I have signed my name to this specification in the presence of two subscribing witnesses.

HERMANN von FREMERY.

Witnesses:
MICHAEL STAUCH,
CHRISTOPH MENNING.